United States Patent [19]
Reichert

[11] 4,292,101
[45] Sep. 29, 1981

[54] METHOD OF FABRICATING COMPOSITE MEMBERS

[76] Inventor: James B. Reichert, 564 Midvale, Apt. 7, Los Angeles, Calif. 90024

[21] Appl. No.: 193,939

[22] Filed: Oct. 6, 1980

Related U.S. Application Data

[63] Continuation of Ser. No. 16,965, Mar. 5, 1979, abandoned.

[51] Int. Cl.³ .............................................. B29D 27/00
[52] U.S. Cl. .................................. 156/156; 156/242; 156/245; 156/293; 156/294; 264/45.2; 264/45.5; 264/46.4; 264/46.6; 264/51; 264/219
[58] Field of Search ..................... 156/77, 78, 79, 155, 156/156, 245, 293, 294, 242; 264/45.2, 45.5, 46.4, 46.6, 50, 51, 54, 219

[56] References Cited

U.S. PATENT DOCUMENTS

| | | | |
|---|---|---|---|
| 2,870,793 | 1/1959 | Bailey | 264/46.6 |
| 3,135,640 | 6/1964 | Kopka et al. | 264/46.6 |
| 3,251,092 | 5/1966 | Printz | 264/50 |
| 3,286,004 | 11/1966 | Hill et al. | 264/46.6 |
| 3,523,990 | 8/1970 | Purdy | 264/51 |
| 3,873,654 | 3/1975 | Smith | 156/245 |
| 4,129,634 | 12/1978 | Cecka et al. | 264/46.6 |
| 4,169,749 | 10/1979 | Clark | 156/156 |

Primary Examiner—Caleb Weston
Attorney, Agent, or Firm—William H. Maxwell

[57] ABSTRACT

A method for the fabrication of high density smooth walled composite members laminated of resin impregnated fibers, and characterized by hydraulic pressure applied by a smooth surfaced core member comprised of noninterconnected cells subjected to heat and expanded thereby in opposition to a complementary mold with a lay-up therebetween simultaneously cured to establish a wall or skin of the product part formed thereby.

17 Claims, 6 Drawing Figures

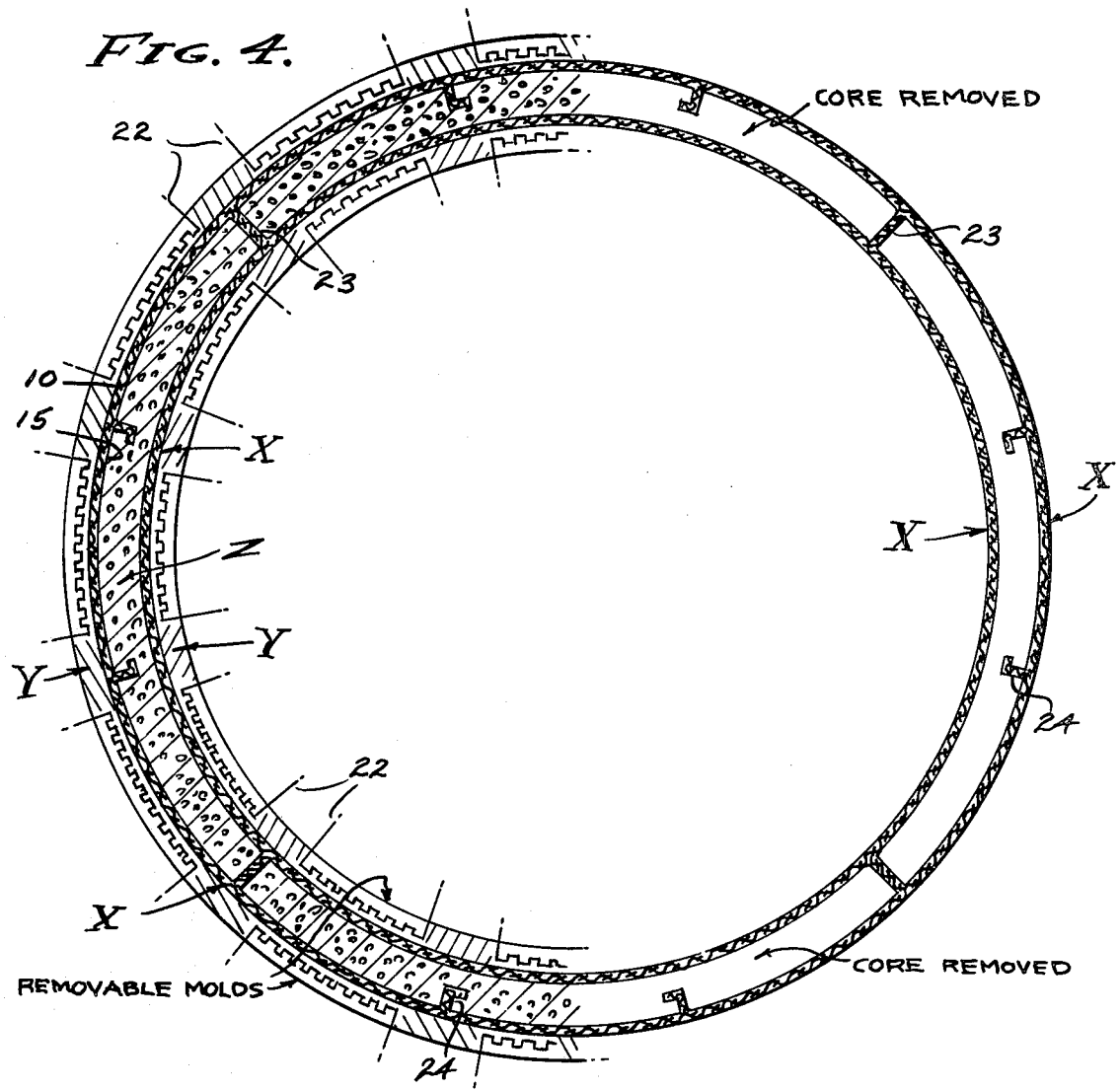
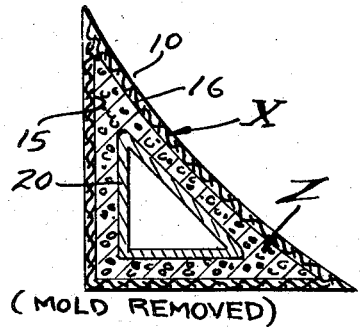
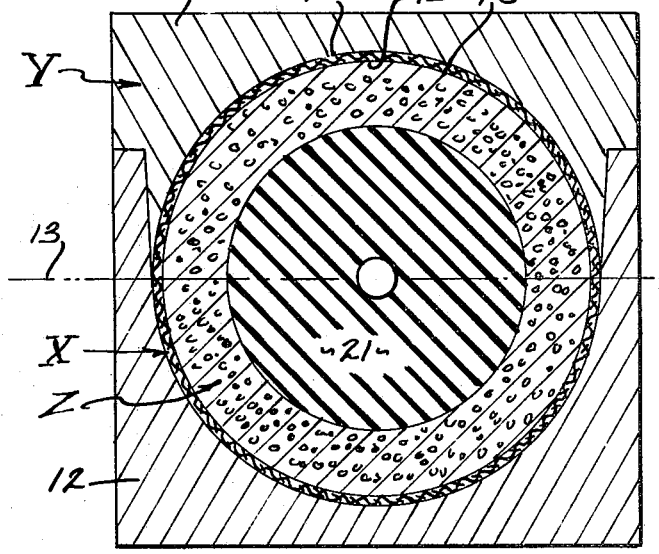

METHOD OF FABRICATING COMPOSITE MEMBERS

This is a continuation of application Ser. No. 16,965 filed Mar. 5, 1979, abandoned, and entitled METHOD OF FABRICATING COMPOSITE MEMBERS.

BACKGROUND

Articles of manufacture are made of resin impregnated fibers cured in molds that form the skin surfaces thereof, such as poles and various cross sectional forms both of parallel and odd or tapered configuration. For example, ski poles of tapered tube form, fairings and airfoils of parallel, tapered and twisted tubular and solid form etc. Heretofore, resin impregnated fibers have been molded over and united with a core that governs configuration, the core determining shape whether or not retained within the skin formation, and whether or not a surrounding mold is employed. It is a general object of this invention, as will be described, to ensure an exacting shape to the skin of an article formed in a mold, by providing a method whereby a composite article is pressured by inherency involved in the core which can be retained or later removed as circumstances require.

The prior art methods of manufacturing sailboat masts involves, for example, the use of carbon fibers applied over an extruded aluminum mast core, with or without pressure applied but with difficulties and great expense in external application of pressure when required, for density of the resin bonded carbon filament lamina. And, said aluminum mast core is retained as the inner lamina, since the laminated mast structure requires a permanent inner form to maintain its cross sectional configuration. Likewise, the manufacture of various body and fuselage sections requires mold surfaces for establishing accurately formed surfaces on the final product. For example, a body form requiring a cored wall with smooth accurately formed inner and outer surfaces requires spaced inner and outer mold forms. Further, lightweight solid or foamed cores may be required, or alternately spacing webs, ribs, stringers or spars may be required; in the structural design. Accordingly, it is an object of this invention to provide a method by which composite members fabricated of resin impregnated fibers can be pressure molded to at least one or two forms to produce smooth accurate walls of the required density. It is to be understood that pressure applied varies with the density requirement in the resin bonded filler laminate.

It is an object of this invention to provide a core that is expansible against a mold form to apply pressure to an intervening lamination while it is being cured. It is not only necessary that the mold surface be smooth and accurately formed, but that the core surface be smooth for preventing the permanent formation of imperfections such as crevices that would initiate cracks and subsequent structural failure. Accordingly, it is another object to provide a smooth surfaced or skinned core that produces a commensurately smooth inner wall. It is still another object to provide heat means compatible with the curing of resins and which simultaneously causes the expansion and pressure application by said core. With the present invention, gas filled noninterconnected cellular core material is employed, supplemented by structural means to increase pressure when required.

A feature of this method is the controlled internal expansion within the core, and its applicability to most all molding situations. The mold can be planar with or without curvatures and/or detail, the mold can be tubular and the core retained or removed, the mold can be comprised of inner and outer forms between which a cored wall is molded; examples of which are shown and hereinafter described.

SUMMARY OF INVENTION

This invention relates to the fabrication of articles that have varied surface, three dimensional, configurations characterized by a skin X that conforms to a mold form Y surrounding a core Z. Advantage is realized in such monocoque structures wherein the skin is stressed and relied upon for strength, either with the core Z removed or retained for maintaining cross sectional configuration. The mold form Y embraces the skin X to be formed in accordance with this invention, utilizing the core Z for the application of internal molding pressures. That is, a feature of this invention is the pressured interface engagement between the skin X and mold form Y. To this end a heat responsive core Z is employed, subject to the cure heat applied to the composite and which is expanded thereby into pressured engagement with the skin X captured against or within the mold form Y. In accordance with this invention, a foamed plastic core of noninterconnected cells is employed, and further a core which plasticizes sufficiently when heated to expand into pressured engagement within the skin so as to configure it to the mold form.

DRAWINGS

The various objects and features of this invention will be fully understood from the following detailed description of the typical preferred forms and applications thereof, throughout which description reference is made to the accompanying drawings, in which:

FIG. 1 illustrates the process applied to the fabrication of a tubular member such as a ski pole or the like.

FIG. 4 illustrates the process applied to the fabrication of a fuselage section characterized by stringers and from which the expansive core of the method has been removed.

FIG. 5 illustrates the process applied to the fabrication of a fairing in which a box member reinforces the core employed in the method. And, FIG. 6 illustrates the process applied to the fabrication of a cylindrical member in which a collapsible mandrel is employed to reinforce the core employed in the method.

PREFERRED EMBODIMENT

Figure 1:
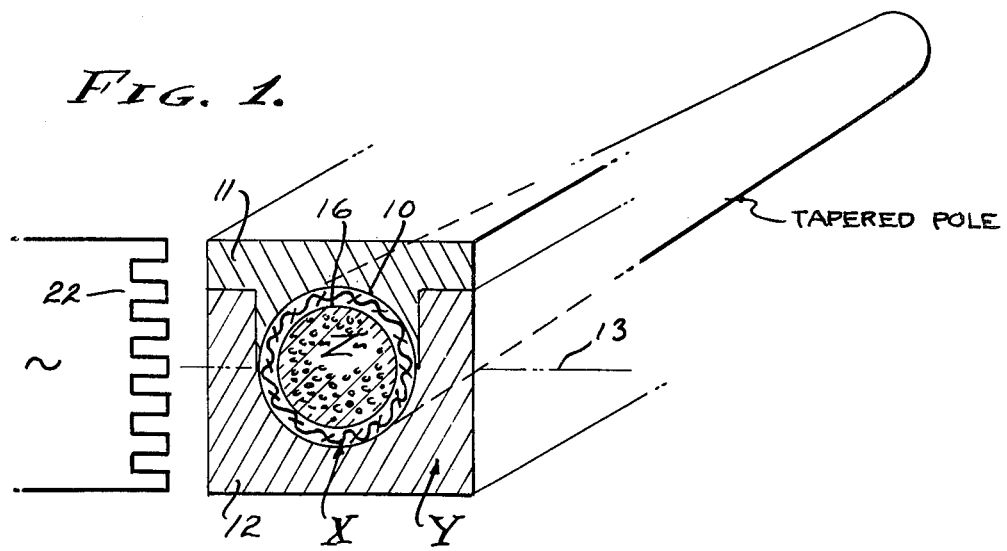
Figure 2:
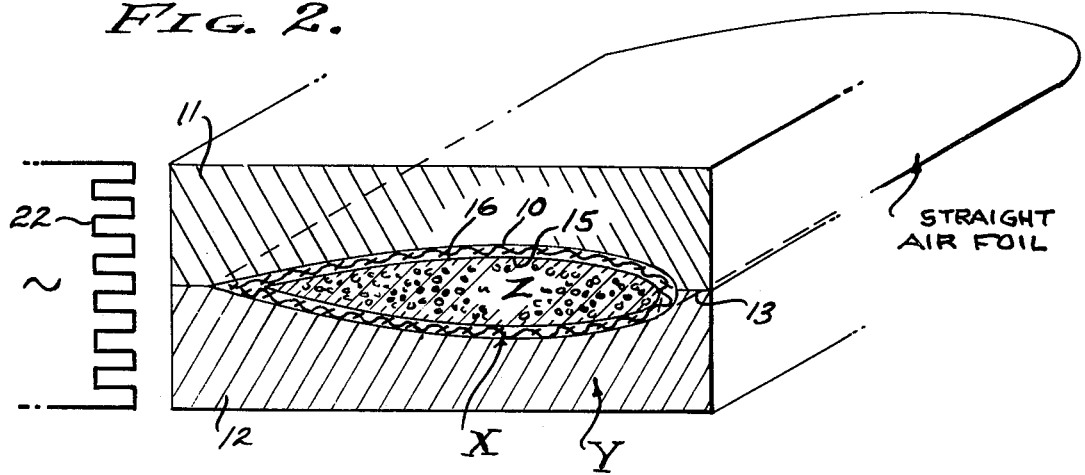
FIG. 2 illustrates the process applied to the fabrication of a monocoque airfoil member.

Referring now to the drawings, it is the fabrication of structural members with which this invention is concerned. The method involved herein applies pressure in the molding of laminated elements which otherwise would be molded without pressure, or that would be pressured by other means. It is the simplicity of the method herein disclosed which is advantageous and which ensures product parts that have accurately formed skins of the required density, the latter being controlled by variations in the pressure applied. The method is carried out by apparatus as indicated herein and comprised principally of the mold form Y and heating means H, the core Z being involved as a process-product member, to establish the skin X formation and high density thereof. As shown throughout the drawings there is versatility in the forms and types of structure that are formed with this heat responsive pressure generating core, in each instance formed with an expansible core that establishes laminating pressure during the curing period.

The first step of the process is to prepare a mold Y to the contour of the part to be produced, for example to the outside contour 10 of the part. The outside contour of the part can be planar, curved (simple or compound), or any three dimensional part such as those shown in the drawings, and which involve female mold halves 11 and 12 that mate together and with an interior configuration to dimensionally establish the exterior of the product part. In practice, hard metal molds are employed, the halves separating at a parting plane 13.

The second step of the process is to prepare a cellular core Z to complement the mold Y and to establish the inner surface of the wall of the part to be produced, and shown herein to establish the inside contour 15 of the part. The mold core Z has an exterior configuration coincident with or exceeding dimensionally the interior of the product part, being formed to the contour 10 of the mold Y. That is, and in accordance with this invention, wall thickness is not established by the core, whereas pressure against the interior of the part wall and mold is to be established thereby. Accordingly, the core Z is made of noninterconnected cellular material, namely foamed plastic such as a Polyether, a Silicone Rubber, a Phenolic, or an Epoxy; all as may be required and/or compatible with the resin binder used in forming the molded product. The density of said foamed material is controlling, as well as is the nature of the gas enclosed within the cells; the said gas being relied upon for expansion and the generation of core pressure exerted by contour 15 in opposition to the mold contour 10. For example, Freon or a heavy fluid such as water boils and exerts expansive pressure when subjected to heat. Therefore, is is to be understood that various gases and/or liquids can be contained within the core cells, and all as circumstances require to effect the required expansion of the core when subjected to heat.

in carrying out the second step of this invention, the exterior 15 of the core Z is contoured to initially conform to the interior contour 10 of the mold Y, and consequently is only slightly depressed when the mold halves 11 and 12 are brought together with the lay-up therebetween. The core Z is produced as by molding the same in the mold Y and at a temperature which produces a skin 16 on the core while controlling the density between, for example, 2 pounds to 80 pounds per square foot as may be required to apply the expansive pressure required when subjected to heat. It is significant that the core material is depressible and thereby compresses the gases entrapped by the cells therein, and whereby outward radial forces are applied by the skin 16 exterior as compression is applied when the mold is closed and heat subsequently applied as later described.

The third step of the process is to lay up a resin impregnated skin X over the core Z or within the mold Y, preferably over the core. The skin lay-up can vary widely, and generally is a layer of random fibers, roving or fabric as may be required. The fiber material and its mode of application can vary greatly also, such as glass, aramid or carbon fibers ranging in diameter from 0.001 to 0.00005 inch, for example. The mode of application can be in layers or be filament winding, held in place by tension, or by layers of "tack film", or by means of the adhesion of the resins of pre-impregnation. The mold can be layed up with as many layers or laminae as may be required, and the fibers, roving or fabric disposed as specified for the skin design of the product part. In the drawings a single layer of woven fabric is shown for illustrative simplicity.

The fourth step of the process is to back-up the core (see FIGS. 1-4) with the mold Y, or with additional apparatus means reinforcing the said core (see FIGS. 5-6). In the event that a planar product part is to be molded, the contoure 10 of mold Y simply opposes the contour 15 of the core Z with the lay-up therebetween to establish the skin X. However, the more complex monocoque product parts as shown throughout the drawings involve the mold Y forming a closed cavity presenting the contour 10 and within which is confined the core Y with its coextensively opposed contour 15. Referring to FIGS. 1-4, it will be observed that the core Z and lay-up of skin X fully occupies the mold cavity, and with an initial prestress compression force as the mold halves are brought together upon the intervening lay-up. Referring to FIGS. 5-6, it will be observed that reinforced backing of the core is provided by a box member 20 in FIG. 5 and by a mondrel 21 in FIG. 6. The box is a rigid member while the mandrel is expansible and/or collapsible. As shown, the mandrel is an elastomer body captured between opposite pistons and pressured axially so that radial displacement thereof exerts expansive pressures into the surrounding core Z. The box and mandrel are provided to reduce the body of the core Z and thereby increase the prestress pressure applied thereby to the lay-up forcing it against the mold Y. The box of FIG. 5 can be left in place or removed as is the mandrel of FIG. 6.

The fifth and final step of this process is to apply pressuring and curing heat to the core Z positioned in the mold with the lay-up of skin X therebetween. The heat applied is moderate so as not to destroy the physical properties of the resins and plastics involved, for example in the range of 200° to 600° F. The heat can be applied by various means, externally as shown or internally of the mold and/or core. In practice, the molding can be carried out in an oven, or by heaters 22 applied to the exterior as is indicated. Heating thereby expands the gases captured within the cellular core Z structure causing it to exert hydraulic forces opposed by the mold Y. The hydraulic expansion of core Z is omnidirectional and thereby conducive to the application of equal pressure into all parts of the mold interior, whereby uniformity of wall density is ensured.

Figure 3:
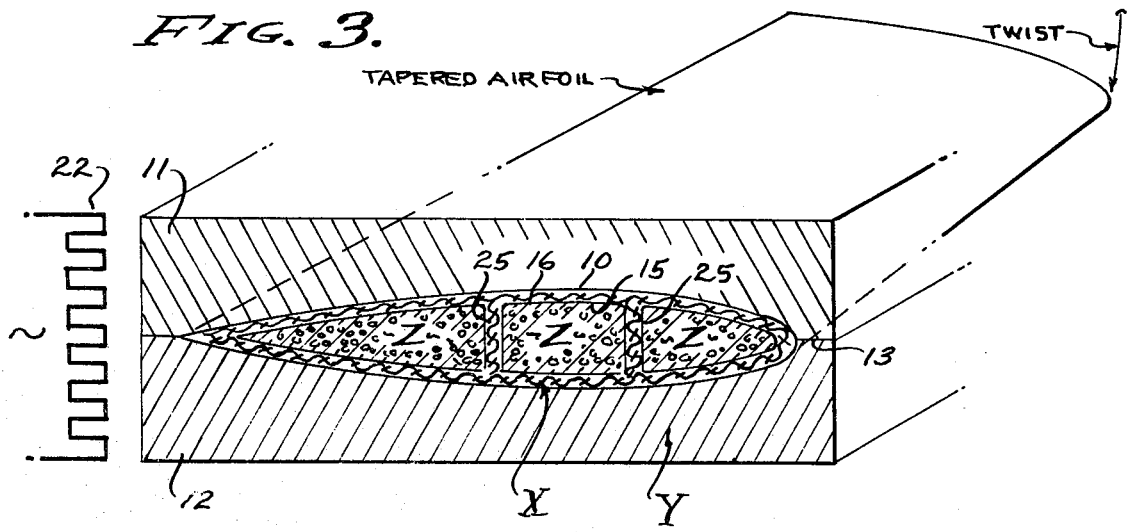
FIG. 3 illustrates the process applied to the fabrication of a webbed airfoil member from which the expansive core of the method may be removed.

From the foregoing it will be seen that a simple and practical method is provided for the fabrication of composite members characterized by monocoque skins comprised of laminate fibers and the like. As shown in FIGS. 3 and 4 this method is conducive to the molding of integral webs 23, stringers 24 and/or spars 25 between opposite skins X, as structural members; in which case the core Z can be subsequently removed as by means of rodding and/or blowing it out. By employing the skin surfaced core Z, the inner wall of the skin X is smooth as is the exterior, and all to the end that stress points such as caused by surface imperfections are virtually eliminated.

The core Z of foamed material comprised of noninterconnected gas filled cells is shaped into a configuration to substantially occupy the chamber of a mold form Y; the lay-up of filament or the like is disposed between an exterior contour 15 of the core Z and an opposing inner contour 10 of the mold form Y; the lay-up being impregnated with a bonding agent (no indicia); and heat applied to effect a cure of the composite into integral form while expanding the gas within the cellular core so as to pressure the same by expansion into engagement with the lay-up while said lay-up is transformed into the skin X retaining the configuration of the mold form Y within which it is confined. The lay-up and resulting skin X can be more or less coextensive with the exterior of the core Z, and it is retained or removed after curing as circumstances require. The layer of filament can vary in form from monofilament to a woven fabric, and as to material substance and as to the number of layers.

Having described only typical preferred forms and applications of my invention, I do not wish to be limited or restricted to the specific details herein set forth, but wish to reserve to myself any modifications or variations that may appear to those skilled in the art as set forth within the limits of the following claims:

I claim:

1. A method for the fabrication of high density precision walled composite members laminated of resin impregnated fibers, and including;
   the first step of preparing a mold with the contour of the part to be produced,
   the second step of preforming a depressible core of cured noninterconnected cellular material containing bodies of expansible fluid therein and of the same shape as and to have a contour exactly complementary to and opposing the contour of the mold,
   the third step of laying up a resin impregnated skin between the mold and the core,
   the fourth step of backing up the core contour with respect to its opposition to the mold contour and depressing the core for compression of the skin,
   and the fifth step of applying heat to the core and skin to expand the fluid bodies contained in the core and cause pressure of the core against the skin and curing the same between the contours of the mold and core respectively.

2. The method of fabricating composite members as set forth in claim 1, wherein mating mold halves are made to join at a parting plane to establish a molding cavity.

3. The method of fabricating composite members as set forth in claim 1, wherein the cellular material is foamed plastic.

4. The method of fabricating composite members as set forth in claim 1, wherein the cellular material is formed to the contour of the mold and of the part to be produced.

5. The method of fabricating composite members as set forth in claim 1, wherein the lay-up of resin impregnated material extends between core sections and is joined to spaced skin sections by lay-up material to form a rib in the part to be produced.

6. The method of fabricating composite members as set forth in claim 1, wherein the cellular material is foamed with a heavy fluid therein for a high rate of expansion.

7. The method of fabricating composite members as set forth in claim 1, wherein the cellular material is depressible and formed to the contour of the mold and of the part to be produced and initially compressed against the layup of resin impregnated skin disposed between said mold and core contours.

8. The method of fabricating composite members as set forth in claim 1, wherein the lay-up of resin impregnated skin is in the mold against the contour thereof.

9. The method of fabricating composite members as set forth in claim 1, wherein the lay-up of the resin impregnated material is over the core against the contour thereof.

10. The method of fabricating composite members as set forth in claim 1, wherein the core contour is backed up by a member opposing the mold contour of the part to be produced.

11. The method of fabricating composite members as set forth in claim 1, wherein the core contour is backed up by an opposing mold contour of the part to be produced.

12. The method of fabricating composite members as set forth in claim 1, wherein the core is reinforced by a member reducing its body and thereby increasing the pressure applied between the opposed contours of the mold and core respectively.

13. The method of fabricating composite members as set forth in claim 1, wherein the core is reinforced by a permanent member reducing its body and thereby increasing the pressure applied between the opposed contours of the mold and core respectively.

14. The method of fabricating composite members as set forth in claim 1, wherein the core is reinforced by a removable member reducing its body and thereby increasing the pressure applied between the opposed contours of the mold and core respectively.

15. The method of fabricating composite members as set forth in claim 1, wherein the core is reinforced by a collapsible member reducing its body and thereby increasing the pressure applied between the opposed contours of the mold and core respectively.

16. The method of fabricating composite members as set forth in claim 1, wherein mating mold halves are made to join at a parting plane to establish a molding cavity, wherein the cellular material is depressible foamed plastic with a substantially smooth skin surface contour and with heavy fluid therein for a high rate of expansion, wherein the lay-up of the resin impregnated material is over the core against the contour thereof, and wherein the core is reinforced by a member reducing its body and thereby increasing the pressure applied between the opposed contours of the mold and core respectively.

17. The method of fabricating composite members as set forth in claim 1, wherein the lay-up of resin impregnated material extends between core sections to form ribs in the part to be produced.

* * * * *